(12) United States Patent  (10) Patent No.: US 7,521,012 B2
Stankowski et al.  (45) Date of Patent: *Apr. 21, 2009

(54) METHOD FOR THE MANUFACTURE OF A COMPOSITE FILTER PLATE

(75) Inventors: Ralph Stankowski, Westford, MA (US); James J. Vigna, Billerica, MA (US)

(73) Assignee: Millipore Corporation, Billerica, MA (US)

( * ) Notice: Subject to any disclaimer, the term of this patent is extended or adjusted under 35 U.S.C. 154(b) by 56 days.

This patent is subject to a terminal disclaimer.

(21) Appl. No.: 11/150,069

(22) Filed: Jun. 10, 2005

(65) Prior Publication Data

US 2005/0280178 A1    Dec. 22, 2005

Related U.S. Application Data

(63) Continuation-in-part of application No. 10/870,802, filed on Jun. 17, 2004, now Pat. No. 7,141,198.

(51) Int. Cl.
*B29C 39/18*   (2006.01)

(52) U.S. Cl. .................. 264/250; 264/263; 264/DIG. 48

(58) Field of Classification Search ........................ None
See application file for complete search history.

(56) References Cited

U.S. PATENT DOCUMENTS

| | | | |
|---|---|---|---|
| 3,722,697 A * | 3/1973 | Burke et al. ................. 210/451 |
| 3,782,083 A * | 1/1974 | Rosenberg .................... 55/491 |
| 3,954,625 A | 5/1976 | Michalski | |
| 4,490,321 A | 12/1984 | Klinkaue et al. | |
| 4,671,873 A * | 6/1987 | Keller ........................ 210/232 |
| 4,861,479 A | 8/1989 | Solzer | |
| 5,316,678 A * | 5/1994 | Heaslip ....................... 210/486 |
| 5,715,741 A * | 2/1998 | Gasser et al. .................. 99/295 |
| 5,885,499 A * | 3/1999 | Aksberg ...................... 264/153 |
| 6,391,241 B1 * | 5/2002 | Cote et al. ................... 264/153 |
| 6,427,846 B1 * | 8/2002 | Graus et al. .................. 210/445 |
| 6,464,084 B2 | 10/2002 | Pulek | |
| 6,699,348 B2 | 3/2004 | Hugert et al. | |
| 7,141,198 B2 | 11/2006 | Stankowski | |
| 2002/0084217 A1 | 7/2002 | Schann | |

FOREIGN PATENT DOCUMENTS

| DE | 3836729 | * 5/1990 |
| FR | 996815 | 12/1951 |
| GB | 2245300 | 1/1992 |

* cited by examiner

*Primary Examiner*—Edmund H. Lee

(57) ABSTRACT

A method is disclosed for making a substantially flat filter plate comprising a substantially flat polymer, preferably thermoplastic, frame and substantially flat filter material seated fixedly therein. The method is characterized by its reduced exposure of the filter material to adverse mechanical stresses resultant of polymeric frame formation and curing. Toward such end, the substantially flat polymeric frame is formed in at least two separate steps, in the course of which said substantially flat filter material is incorporated. The portion formed first serves as a mechanical restraint, insulating the later incorporated filter material from any propensity of the second "embedding" portion to shrink or otherwise warp during its formation.

9 Claims, 1 Drawing Sheet

METHOD FOR THE MANUFACTURE OF A COMPOSITE FILTER PLATE

CROSS-REFERENCE RELATED APPLICATIONS

This application is a Continuation-in-Part application of U.S. application Ser. No. 10/870,802, filed on Jun. 17, 2004, now U.S. Pat. No. 7,141,198, the entire contents incorporated herewith.

FIELD

The present invention is directed, in general, to methodologies for making composite filter plates, and in particular, to a method for making a substantially flat filter plate comprising a thermoplastic frame and filtration material, the filtration material being embedded in said frame fixedly, yet under reduced exposure to mechanical stress.

BACKGROUND

Filter plates are well known. The varied structures, applications, and functions thereof are vast. The basic format—i.e., a configuration comprising substantially flat filtration material incorporated within and held by an outer thermoplastic framework—has been used widely in the construction of, for example, filter presses, normal flow filter disks, electrodeionization devices, multiwell plates, and tangential flow filtration devices.

Under conventional methodologies for manufacturing filter plates, the filtration material is often fixedly incorporated either simultaneously or contemporaneously with the formation of the outer thermoplastic framework. While such methodologies continue to be used with good results, for certain applications, the well-documented post-formation, pre-curing dimensional instabilities of many thermoplastic materials (e.g., shrinkage) can have an unintended influence on the structural integrity of incorporated filtration material. For example, if the filtration material sought to be incorporated is of a type engineered to enable high resolution fluid separations (such as common in biopharmaceutical fluid separations), even a slight structural permutation of a surrounding polymeric framework, even if short lived and temporary, can compromise unacceptably the structural integrity of said filtration material. Certain polymeric raw materials, as the case also with large bulky frame formats, can produce such severe structural contortions during curing that the structural and functional integrity of even a robust filter material is not immune from such influences.

Although technological advances have resulted in the development of polymeric raw materials—such as glass-fiber polymer composites—that retain substantial dimensional stability throughout formation and curing, such innovative materials are often costly. In light of the escalating push in the pharmaceutical industry towards so-called "disposable manufacture", the costs of such innovative polymeric materials can be prohibitive. They are, in many instances, economically unavailable for use in the making of disposable filtration components and devices.

Need thus exists for an alternative method for making substantially flat filter plates, wherein filtration material can be embedded or otherwise incorporated within a polymeric frame securely, but with less exposure to the dimensional instabilities of the polymeric raw material used to form said frame.

SUMMARY

In response to the above and other needs, the present invention provides, in general, a method for making a substantially flat filter plate comprising a substantially flat polymeric polymer frame with substantially flat filter material seated fixedly therein, the method characterized by its reduced exposure of the filter material to the adverse mechanical stresses resultant of polymeric frame formation and curing.

The method, in particular, commences with the formation from a polymer (or precursor thereof), preferably a thermoplastic, of an outer first portion of the substantially flat polymeric frame, the outer first portion having an inner peripherally-displaced ledge of more than sufficient depth and width to hold said substantially flat filter material in substantially coplanar relation within said polymeric frame. The outer first portion is rendered substantially dimensionally stable, for example, by curing. The desired substantially flat filter material is then seated upon said inner peripherally-displaced ledge. Finally, the inner second portion of said substantially polymeric frame is formed by depositing the same or similar polymer (or precursor thereof) in unfilled areas of said inner peripherally-displaced ledge, thereby substantially completing said polymeric frame and fixing said seated filter material in place.

It is a principal object of the present invention to provide a method for the manufacture of a substantially flat filter plate, said substantially flat filter plate comprising a substantially flat polymeric frame with substantially flat filter material seated fixedly therein.

It is another object of the present invention to provide a method for the manufacture of a substantially flat filter plate comprising a substantially flat polymeric frame with substantially flat filter material seated fixedly therein, wherein said substantially flat polymeric frame is formed in at least two separate steps, during which said substantially flat filter material is incorporated.

It is another object of the present invention to provide a method for the manufacture of a substantially flat filter plate comprising a substantially flat polymeric frame with substantially flat filter material seated fixedly therein, wherein said substantially flat polymeric frame is formed of at least two different polymeric raw materials in at least two different and separate steps, and during which said substantially flat filter material is incorporated.

It is another object of the present invention to provide a method for the manufacture of substantially flat filter plate comprising a substantially flat polymeric frame having fixedly embedded therein a substantially flat, but comparatively thick, filter packet, wherein said filter packet comprises more than one layer of filter material.

It is another object of the present invention to provide a substantially flat filter plate, said filter plate being made through a process wherein filter material is embedded into a polymeric frame fixedly, and with reduced exposure to mechanical stress.

DETAILED DESCRIPTION

The present invention, in general, provides a two step method for making a substantially flat filter plate, said plate comprising a substantially flat polymeric polymer frame into which there is embedded, seated fixedly therein, substantially flat filter material.

The two step methodology is conducted to accommodate the structural variability of the materials employed in a manner that reduces unintended and undesired deformation of the embedded substantially flat filter material, resulting in a product with comparatively little, if any, bowing, warping, bulging, and other like deformities. Such deformities can have an unfavorable impact on the functionality, effectiveness, and/or longevity of a resultant filter plate. The method is robust and can be performed to attain comparatively high product yields.

Figure 2A:
FIGS. 2a to 2c are lateral views of the first outer portion 12 (taken along cross-sectional axis A-A in FIG. 1) as it is progressively made into a substantially flat filter plate 10, according to said representative mode of practicing the inventive methodology.
Figure 2B:
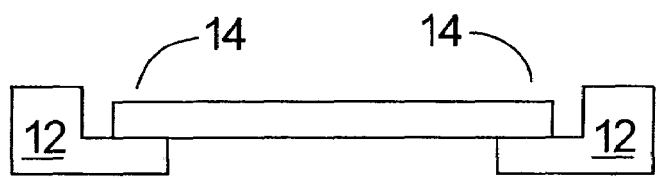
Figure 2C:
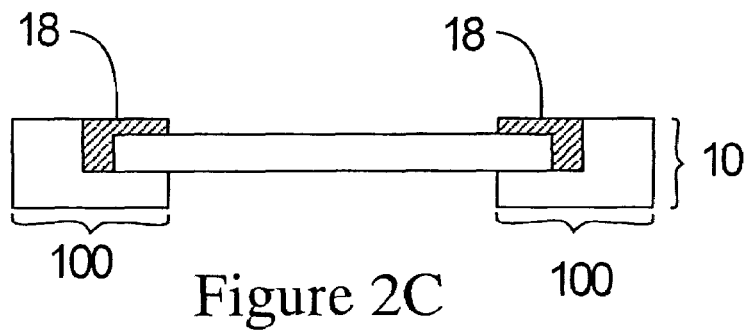

The steps of the two-step embedding methodology are illustrated schematically in FIGS. 2a to 2c.

First, as shown in FIG. 2a, an outer first portion 12 of said substantially flat polymeric frame 10 is formed from a polymeric polymer (or precursor thereof). (See also, FIG. 1). The configuration of the outer first portion 12 is variable, but should at the least have an inner peripherally-displaced ledge 14 of more than sufficient depth and width to hold the desired substantially flat filter material 30 in substantially coplanar relation within said polymeric frame 100.

Second, the outer first portion 12 is annealed, cured, or otherwise processed under conditions sufficient in respect of duration, temperatures, and like conditions to render the outer first portion 12 of the polymeric frame 100 substantially dimensionally stable.

Third, after the outer first portion is rendered to a desired degree of dimensional stability, the substantially flat filter material 30, as shown in FIG. 2b, is then seated within said inner peripherally-displaced ledge 12 in substantially coplanar relation with said first portion 112 of said substantially flat polymeric frame 10.

Fourth, and finally, as shown in FIG. 2c, an inner second portion 18 of said substantially polymeric frame 10 is formed by depositing (and preferably curing) the same, similar, or compatible polymeric polymer (or precursor thereof) in the unfilled areas of said inner peripherally-displaced ledge 14—i.e., the gap(s) or space(s) remaining between the filter material and the outer first portion 12)—thereby completing the polymeric frame 100 and fixing said seated filter material 30 in place.

Preferably, in respect of costs and ease of manufacture and handling, the outer first portion 12 should at least initially be formed as a monolith, i.e., a single, integral, unassembled part. Other parts or components can be added, if desired, in later steps of the inventive methodology or after completing the manufacture of the filter-embedded polymeric frame 100.

The polymeric frame 10 of the present invention essentially comprises the combination of the outer first portion 12 (formed first) and the second inner portion 18 (formed later). Hence, the inner first portion 12 can essentially be defined as that which constitutes the polymeric frame 100 less the second inner portion 18.

The outer first portion 12 can include several different integrally formed structural features. For example, in the embodiment illustrated in FIG. 1, the outer first portion can include ports 22 that can be configured to direct the flow of fluid appropriately in a larger device assembled from several of the inventive filter plates 10. Other structural features can be integrated, as needed, such as an integrally formed manifold system or like flow paths or channels, inner and/or outer wall structures, alignment guides or couplers to assist in the stacking of several filter plates 1, plate-to-plate port plugs and spacers, rigidity enhancing ribs, braces, and brackets, and other like structures that either provide additional filtration-related, assembly-related, and/or manufacture-related functionality.

In respect of it general size and mass, the first outer portion 12 will constitute the predominant bulk of the entire polymeric frame 100, with the second inner portion 18 constituting only a fraction thereof. A larger first outer portion 12 serves as a functionally better brace for a smaller second inner portion 18, thus affording greater dimensional stability throughout the remaining steps of the inventive methodology. In the same vein, shrinkage (and/or other unwanted deformation) of the second inner portion, when and if it occurs during later curing steps, will have a less of a deleterious influence on the integrity of the filter material it embeds, if that portion is comparatively small in mass and bulk.

Figure 1:
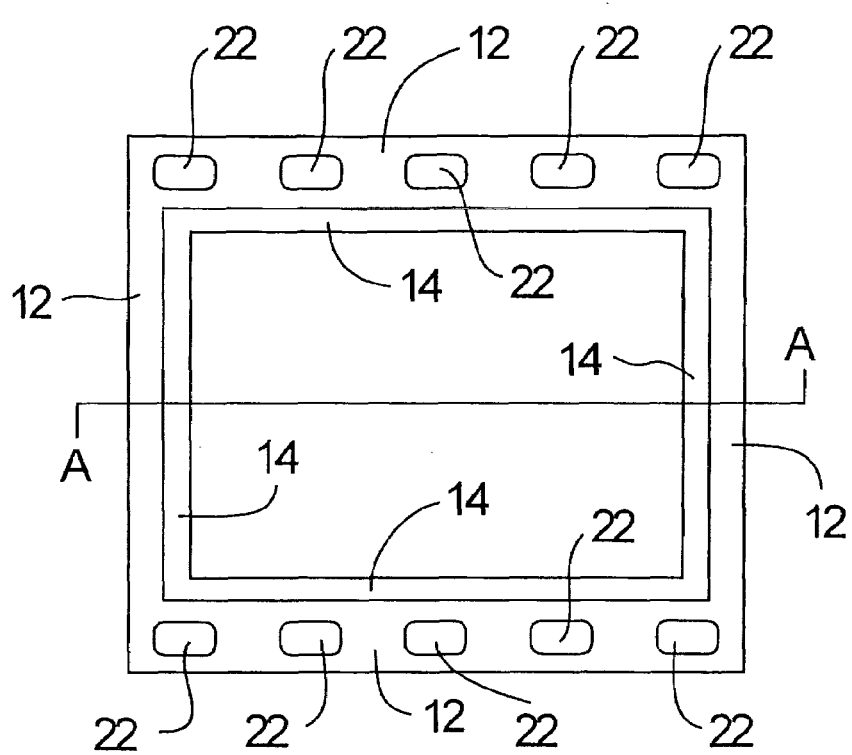
FIG. 1 illustrates schematically a first outer portion 12 of a polymeric frame 100 formed in accordance with a representative mode of practicing the inventive methodology.

As shown in FIG. 1, the outer first portion 12—although subject to much structural variation—comprises at the least an inner peripherally-displaced ledge 14 of more than sufficient depth and width to hold said substantially flat filter material in substantially coplanar relation within said polymeric frame 10.

The inner peripherally-displaced ledge 14 provides a platform onto which the substantially planar filter material 30 is seated in later steps of the method. The inner peripherally-displaced ledge can in its structure simply be a groove or bevel or ledge or tab molded, chiseled, or cut into or otherwise provided around the inner girth of the frame's outer first portion 12. The inner peripherally-displaced ledge should be structured with an eye towards facilitating the easy seating of the substantially flat filter material 30, for example, by not creating unnecessary structural features that could block or impede or otherwise constrain easy access of filter material 30. An easily accessible inner peripherally-displaced ledge 14 will encourage gentle handling of delicate filter materials, reducing rough and forcible manipulations that could compromise later functionality of the embedded filter material 30. If desired, the inner peripherally-displaced ledge 14 may also be provided with integrally formed spacers, insets, ribs, rails, or other like guides to assist in the proper alignment and/or orientation of the substantially planar filter material 30.

In respect of forming methods, the polymeric frame can be formed from a variety of polymeric materials (or monomeric or oligomeric precursors thereof), for example, by well-known injection molding processes. Other plastic forming methodologies include, for example, thermoforming, transfer molding, hot stamping, reaction injection molding, compression molding, extrusion, liquid casting, selective laser sintering, and stereolithography. Other polymeric part forming technologies are well known to those skilled in the art.

Examples of suitable polymer material include, but are not limited to, thermoplastics such as polycarbonates, polyesters, nylons, PTFE resins and other fluoropolymers, acrylic and methacrylic resins and copolymers, polysulphones, polyethersulphones, polyaryl-sulphones, polystyrenes, polyvinyl chlorides, chlorinated polyvinyl chlorides, ABS and its alloys and blends, polyolefins (e.g., low density polyethylene, high density polyethylene, and ultrahigh molecular weight polyethylene and copolymers thereof), polypropylene and copolymers thereof, and metallocene generated polyolefins as well as thermoset polymers such as polyurethanes, epoxies and the like.

As indicated, after the outer first portion 12 is formed, it is then allowed to cure (or otherwise "harden") to a desired dimensional stability.

Dimensional stability is defined herein as the ability of a material to maintain its size and shape under various temperatures and stresses. It is not necessary in the practice of the present invention that dimensional stability be maintained for a broad and/or extreme range of conditions. Rather, in view of the objectives of the present invention, the molded part should be "sufficiently" dimensionally stable, to withstand substantially the temperatures and other stresses likely to be encountered during the formation and curing of the inner second portion 18 of said polymeric polymer frame 10.

Although dimensional stability involves a variety of potential undesirable structural variances—such as warping, bowing, fibrillation—the principal, but not exclusive, concern of the present invention is shrinkage. Shrinkage—as used herein—is considered the difference between the size of a part after it has reached normal or ambient temperature and its size immediately after formation. For example, a polymeric frame molded of a general-purpose polystyrene resin will exhibit a mold shrinkage of 0.003 inch/inch to 0.007 inch/inch (0.0076 cm/cm to 0.0178 cm) depending on molding parameters, such as cavity pressure. Other polymeric materials will exhibit different shrinkage rates and ratios.

Given the broad parameters available for the practice of the present invention, including the utility of broad ranges of polymeric starting materials, and precursors thereof, the particular step (or steps) by which dimensional stability is attained is also subject to wide variation. Depending on the starting material, substantial dimensional stability can be attained, for example, by aging a formed part from several minutes to several hours; and/or by placing it in an oven at an elevated temperature; and/or by compressing it in a press; and/or by soaking it in a boric acid bath or other chemical stabilizer or crosslinker; and/or by exposing it to actinic irradiation. Other like strategies can be employed by those skilled in the art. These and other strategies can be employed contemporaneously with the first formation step, potentially within the same manufacturing apparatus used therefor.

Determining the step needed to attain "substantial dimension stability" requires consideration of the particular starting material used. For example, when using so-called "crystallizable" polymers, the amount of shrinkage is of more concern than for so-called "glass forming" polymers, i.e., due to the relatively large contraction upon crystallization. The amount of crystallization not only determines the magnitude of contraction and shrinkage of the product but also its mechanical properties. Thus, dimensional and mechanical consistency of the product can be maintained by measuring and controlling crystallization. Another approach to maintaining dimensional stability is to measure and control the rate of shrinkage at a specified time in the mold cycle by feedback control of operating conditions such as temperature of injected resin, temperature of the mold, injection pressure and hold pressure.

In respect particularly of injection molding procedures, it will be appreciated that mold shrinkage is application and process dependent. For all polymeric materials, higher melt and mold temperatures increase the part shrinkage, while higher molding pressures reduce part shrinkage.

Dimensional stability of a molded part is a function of the inherent characteristics of the material and the conditions that the finished parts are exposed to, either in use or storage. It is also strongly influenced by the method of processing—and related to forming temperature, pressure, cooling rate and section thickness.

The final dimensions of a molded part are determined by the complexity and size of the mold cavity and the tendency of the material being molded to shrink as it cools in the mold. For example, since polystyrene resins are amorphous (non-crystalline) materials, they exhibit less mold shrinkage than crystalline materials such as polyethylene and polypropylene.

For certain materials, attaining higher levels of dimensional stability may be desirable. Well-known annealing processes can be implemented toward such end. Annealing essentially allows fabricated parts to maintain performance properties and dimensional tolerances at higher temperatures than are possible without annealing.

Annealing is often best conducted in a controlled, air-circulating oven at a temperature approximately 5 to 10° F. below the practical heat distortion temperature as determined on the end use part. Tests have shown properties of parts annealed in a hot water bath to be slightly less than those of hot-air annealed parts. Oven annealing is recommended for optimum properties.

As indicated, after the outer first portion 12 is cured to desired dimensional stability, a substantially flat filter material is seated within inner peripherally-displaced ledge 14. As shown in FIG. 2c, when seated, the substantially flat filter material 30 is preferably positioned in "substantially coplanar" relation with the polymeric frame. Such preference, of course, is not required in all circumstances, such as, for example, when a slight tilt or inclination in the filter material 30 is desired for functional or other reasons. Regardless, those skilled in the art will appreciate the several assembly and functional issues that may ensue if the filter material is improperly seated, askew within the polymeric frame 12.

In desirable embodiments of the present invention, the substantially flat filter material 30 will have a configuration of approximately rectangular or circular shape, matching essentially the shape of the inner peripherally-displaced ledge 14. Preferably, the filter material will be formed of slightly less length, width, and thickness (if rectangular) or slightly less diameter and thickness (if circular) than the inner peripherally-displaced ledge 14, such that when seated therein, positioned with a relatively uniform space (i.e., a gap) around its outer edges, the desired unfilled areas of the inner peripherally-displaced ledge (i.e., the gap) remain for the second frame forming step.

Alternatively, the filter material 30 can be configured to fit snuggly, side-to-side, within the inner peripherally-displaced ledge 14. Since no gap would exist in such embodiment, however, the filter material would still preferably need to be designed with a lesser thickness, and/or holes or likes openings drilled, punched, or otherwise provided on and through its outer edge(s). Such "lesser thickness" and "openings" is to be construed herein as the aforementioned "unfilled areas", functioning in the same manner as the aforementioned gap.

The present invention is not limited to any particular type of composition of or manufacture of the substantially flat filter material.

The substantially flat filter material 30 can be selected or constructed from any of several commercially-available or otherwise known filters, membranes, and other like gas or liquid fluid separation products and technologies. The substantially flat filter material can be unitary (such as a single sheet of membrane) or composite (such as a "pad filter" comprising layers of different filter materials). The filter material 30 can vary, among the several embodiments of the present invention, in its permeability (e.g., suitability for "primary clarification", "secondary clarification", "polishing", etc.); its chemistry (e.g., hydrophobicity, hydrophilicity, oleophobicity, oleophilicity, etc.); and its intended application (e.g., tangential flow filtration, gas filtration, dialysis, electrodeionization, depth filtration, etc.).

Material useful for the manufacture of the substantially flat filter material 30 include synthetic or natural compositions and may be inorganic, organic, or mixture thereof. Typical inorganic materials include, but are not limited to, glasses, ceramics, metals, cermets (i.e., ceramic/metal composites), and the like. The organic materials are generally polymeric in nature, and can be substituted or unsubstituted. Typical polymers include, but are not limited to, polysulfones; polystyrenes, including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate; cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylylene oxide); poly(esteramide-diisocyanate); polyurethanes; polyesters (including polyarylates) such as poly(ethylene terephthalate), poly(alkyl methacrylates), poly(alkyl acrylates), poly(phenylene terephthalate), etc.; polysulfides; poly(siloxanes); polymers from monomers having the alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above and grafts and blends containing any of the foregoing. Typical substituents include halogens; such as fluorine, chlorine and bromine; hydroxy groups; lower alkyl groups; lower alkoxy groups; monocyclic aryl; lower acyl groups; and the like.

A particularly preferred embodiment of the substantially flat filter material is a pad-like density gradient filter packet, such as described in related, co-pending U.S. application Ser. No. 10/871,694, filed on Jun. 17, 2004, entitled "Disposable Integral Filter Unit". As described therein, the deep gradient filter packet comprises a plurality of adjacent filter layers interposed between a pair of screens 352, wherein the retention of each said filter layer is greater than (i.e., more selective) than the layer preceding it. In one particular embodiment, the deep gradient filter packet is composed as follows:

| Component | Material | Thickness (in.) | Permeability (LMH/psi) |
|---|---|---|---|
| Screen 352 | Polypropylene extruded diagonal weave screen | 0.022 | — |
| Filter Layer 355 (DE50) | Wet-laid pad comprising cellulose wood pulp and diatomaceous earth | 0.13 | 1800 |
| Filter Layer 357 (DE75) | Wet-laid pad comprising cellulose wood pulp and diatomaceous earth | 0.13 | 300 |
| Membrane 351 (RW01) | Mixed esters of cellulose, microporous membrane, nominal 0.1 micron pore size | 0.009 | 200 |
| Screen 354 | Polypropylene extruded diagonal weave screen | 0.022 | — |

As shown in FIG. 2c, the final steps of the inventive methodology involve forming the inner second portion 18 of the substantially polymeric frame 100 by depositing a polymer (or precursor thereof) in unfilled areas of said inner peripherally-displaced ledge 14, thus completing substantially said polymeric frame 100 and fixing the seated substantially flat filter material 30 in place.

The polymer (or precursor thereof) used for the second frame forming step may be identical or similar to the thermoplastic material used in the first frame forming step. If a non-identical material is used, compatibility of the second material with the second material should be considered in light of the objectives of the invention. Hence, the second material, when deposited and cured, should form a good bond with the formed first outer portion 12. It should also be capable of forming a second outer portion of sufficient durability to hold fixedly the embedded filter material 30 under a broad range of potential filtration conditions.

In much the same way that identity is not required of the first and second thermoplastic materials, the method used for the formation of the second frame forming step need not be the same as that used for the first frame forming step. In other words, although the second frame formation step can be selected from the same methodologies identified above, it need not be the same. For example, the outer first portion 12 can be formed (i.e., the "first frame forming step") by injection molding; and the inner second portion 18 formed later (i.e., the "second frame forming step") by extrusion and annealing. Although dependent on the forming methodologies selected, the interfacial bond between first and second portions will likely remain visible or otherwise detectable in cross-sections of a finished polymeric frame 10, even though the finished frame is—as a result of the fusion of the first and second frame portions—structurally monolithic.

When deposited, the selected polymeric material (or precursor thereof) should flow into and fill the "unfilled areas" of the inner peripherally-displaced ledge 14, contacting and covering the yet exposed or otherwise "open" surfaces of both the inner peripherally-displaced ledge and those at or proximate the outer edges of the filter material 30. As the thermoplastic material cures (or otherwise hardens), shrinkage or warping will likely occur, but to a more limited extent in view of the spatial constraints imposed by the dimensionally-stabilized outer first portion 12, as well as its comparatively smaller mass. The filter material 30 thus becomes embedded robustly within the finished polymeric frame 10, under conditions that are comparatively less stressful and thus less likely to compromise the structural and functional integrity of the filter material.

After completion of the substantially flat filter plate 10, further steps can be taken, for example, to either provide additional functionality and/or further render the filter plate more amenable to subsequent additional assembly into a larger filtration device. In this regard, it will be appreciated that the "final" filter plate 10 can either be a "finished product" ready for its intended use or a "finished component" ready for installation. Other post-embedding steps can include, for example, the drilling of ports through the filter plate, the addition of flow distributors and flow paths; the removal of burrs, sprue, and/or other like unwanted residual molding waste; surface application of hydrophobic or hydrophilic coatings; surface polishing or roughening; autoclaving, steam sterilization, or other sanitizing chemical treatment; and packaging.

While the present invention has been described with reference to certain particular embodiments thereof, those skilled in the art, having the benefit of the teachings of the present invention set forth here, can affect numerous modifications thereto. The modifications are to be considered as being encompassed within the scope of the present invention as forth in the appended claim.

What is claimed is:

1. A method for making a substantially flat filter plate, said filter plate comprising a substantially flat thermoset polymer frame with substantially flat filter material seated fixedly therein, the method comprising the steps of:
   (a) forming from a thermoset polymer or precursor thereof an outer first portion of said substantially flat thermoset polymeric frame, said outer first portion having an inner peripherally-displaced ledge of more than sufficient depth and width to hold said substantially flat filter material in substantially coplanar relation within said thermoset polymeric frame;
   (b) rendering said outer first portion substantially dimensionally stable;
   (c) seating said substantially flat filter material in said inner peripherally-displaced ledge; and
   (d) forming an inner second portion of said substantially thermoset polymeric frame by depositing said thermoset polymer or precursor thereof in unfilled areas of said inner peripherally-displaced ledge, thereby substantially completing said frame and fixing said seated filter material in place.

2. The method of claim 1, wherein said outer first portion includes flow paths to and from said fixedly-seated, substantially flat filter material.

3. The method of claim 1, wherein said outer first portion comprises the predominant portion of said substantially flat frame.

4. The method of claim 1, wherein said substantially flat filter material is a deep gradient filter packet comprising layers of filtration material encapsulated within a porous outer envelope.

5. A method for making a substantially flat filter plate, said filter plate comprising a substantially flat thermoset polymer frame with substantially flat filter material seated fixedly therein, the method comprising the steps of:
   (a) forming from a first thermoset polymer or precursor thereof an outer first portion of said substantially flat frame, said outer first portion having an inner peripherally-displaced ledge of more than sufficient depth and width to hold said substantially flat filter material in substantially coplanar relation within said frame;
   (b) rendering said outer first portion substantially dimensionally stable;
   (c) seating said substantially flat filter material in said inner peripherally-displaced ledge; and
   (d) forming an inner second portion of said frame by depositing a second thermoset polymer or precursor thereof in unfilled areas of said inner peripherally-displaced ledge, thereby substantially completing said frame and fixing said seated filter material in place.

6. The method of claim 5, wherein said outer first portion includes flow paths to and from said fixedly-seated, substantially flat filter material.

7. The method of claim 5, wherein said outer first portion comprises the predominant portion of said substantially flat frame.

8. The method of claim 1 or claim 5, wherein the thermoset polymer comprises a polyurethane.

9. The method of claim 1 or claim 5, wherein the thermoset polymer comprises an epoxy.

* * * * *